United States Patent [19]

Yamaguchi

[11] Patent Number: 4,821,833
[45] Date of Patent: Apr. 18, 1989

[54] MOTORCYCLE WITH SWING-ARM FRONT SUSPENSION

[75] Inventor: Ken Yamaguchi, Saitama, Japan

[73] Assignee: Honda Giken Kogyo Kabushiki Kaisha, Tokyo, Japan

[21] Appl. No.: 57,503

[22] Filed: Jun. 3, 1987

[30] Foreign Application Priority Data

Jun. 4, 1986 [JP] Japan .................... 61-129846

[51] Int. Cl.[4] ............ B62K 25/04; B62K 25/16
[52] U.S. Cl. .................... 180/219; 280/275; 280/279
[58] Field of Search ............ 180/219; 280/275, 276, 280/277, 279

[56] References Cited

U.S. PATENT DOCUMENTS

| 3,521,904 | 7/1970 | Sheffer | 280/270 |
|---|---|---|---|
| 3,642,083 | 2/1972 | Rodler, Jr. | 180/224 |
| 4,265,329 | 5/1981 | de Cortanze | 180/219 |
| 4,388,978 | 6/1983 | Fior | 280/275 X |
| 4,526,249 | 7/1985 | Parker | 280/275 X |
| 4,638,881 | 1/1987 | Morioka et al. | 180/219 |
| 4,700,799 | 10/1987 | Kawano | 180/219 |
| 4,721,179 | 1/1988 | Yamaguchi et al. | 180/219 |
| 4,723,620 | 2/1988 | Ono | 180/219 |
| 4,723,785 | 2/1988 | Kawaguchi et al. | 280/275 |
| 4,741,545 | 5/1988 | Honma et al. | 280/92 |
| 4,756,379 | 7/1988 | Kawano et al. | 180/219 |

FOREIGN PATENT DOCUMENTS

| 2332169 | 6/1977 | France . | |
|---|---|---|---|
| 53-142739 | 12/1978 | Japan | 180/219 |
| 54-122538 | 9/1979 | Japan . | |
| 57-15087 | 1/1982 | Japan . | |
| 58-49435 | 11/1983 | Japan . | |
| 60-105589 | 7/1985 | Japan . | |
| 158616 | 1/1921 | United Kingdom | 280/276 |

OTHER PUBLICATIONS

Excerpt from Motorcyclist Magazine (Apr. 1979).

Primary Examiner—David M. Mitchell
Assistant Examiner—Mitchell J. Hill
Attorney, Agent, or Firm—Irving M. Weiner; Joseph P. Carrier; Pamela S. Burt

[57] ABSTRACT

A motorcycle engine is disposed between the front and rear wheels of a motorcycle, and has a pair of cylinders. A front wheel suspension mechanism has a swing arm assembly extending forwardly, the front wheel being steerably supported on a front end of the swing arm assembly. The front wheel suspension mechanism has a damper or upper and lower arms disposed between the cylinders of the engine. Since the damper is positioned in the space between the engine cylinders, the damper may be of an increased length.

6 Claims, 3 Drawing Sheets

MOTORCYCLE WITH SWING-ARM FRONT SUSPENSION

BACKGROUND OF THE INVENTION

1. Field of the Invention:

The present invention relates to a motorcycle having a swing-arm front suspension mechanism, and more particularly to such a swing-arm front suspension mechanism including a damper or shock absorber.

2. Description of the Relevant Art:

Japanese Patent Publication No. 58-49435 discloses a motorcycle having a swing-arm front wheel suspension comprising upper and lower swing arms, a front wheel steerably supported on the front ends of the swing arms by a knuckle, and a damper coupled to the lower swing arm. The damper is offset or displaced transversely from the longitudinal central axis of the motorcycle. The offset damper requires other motorcycle components to be carefully adjusted in position to make the motorcycle well weight-balanced. In addition, the damper is subject to limitations as to size and location since it is positioned in a relatively small space defined by the front wheel, the engine, and the lower swing arm below the engine.

Another motorcycle swing-arm suspension disclosed in Japanese Utility Model Laid-Open Publication No. 60-105589 includes a damper coupled to a swing arm and located below a motorcycle engine. Problems with the damper positioned below the engine are that the minimum height of the motorcycle body from ground is reduced and the damper needs to be protected from stones or other foreign matter.

SUMMARY OF THE INVENTION

It is an object of the present invention to provide a motorcycle having a swing-arm front suspension mechanism which includes a damper that may be of an increased length and greater freedom of a cushioning stroke for increased cushioning capability.

Another object of the present invention is to provide a motorcycle having a swing-arm front suspension mechanism which includes a damper so positioned as to make the motorcycle well weight-balanced.

According to the present invention, there is provided a motorcycle comprising front and rear wheels, an engine disposed between the front and rear wheels and having a pair of cylinders, and a front wheel suspension mechanism having a swing arm assembly extending forwardly, the front wheel being steerably supported on a front end of the swing arm assembly, the front wheel suspension mechanism having a portion disposed between the cylinders of the engine.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
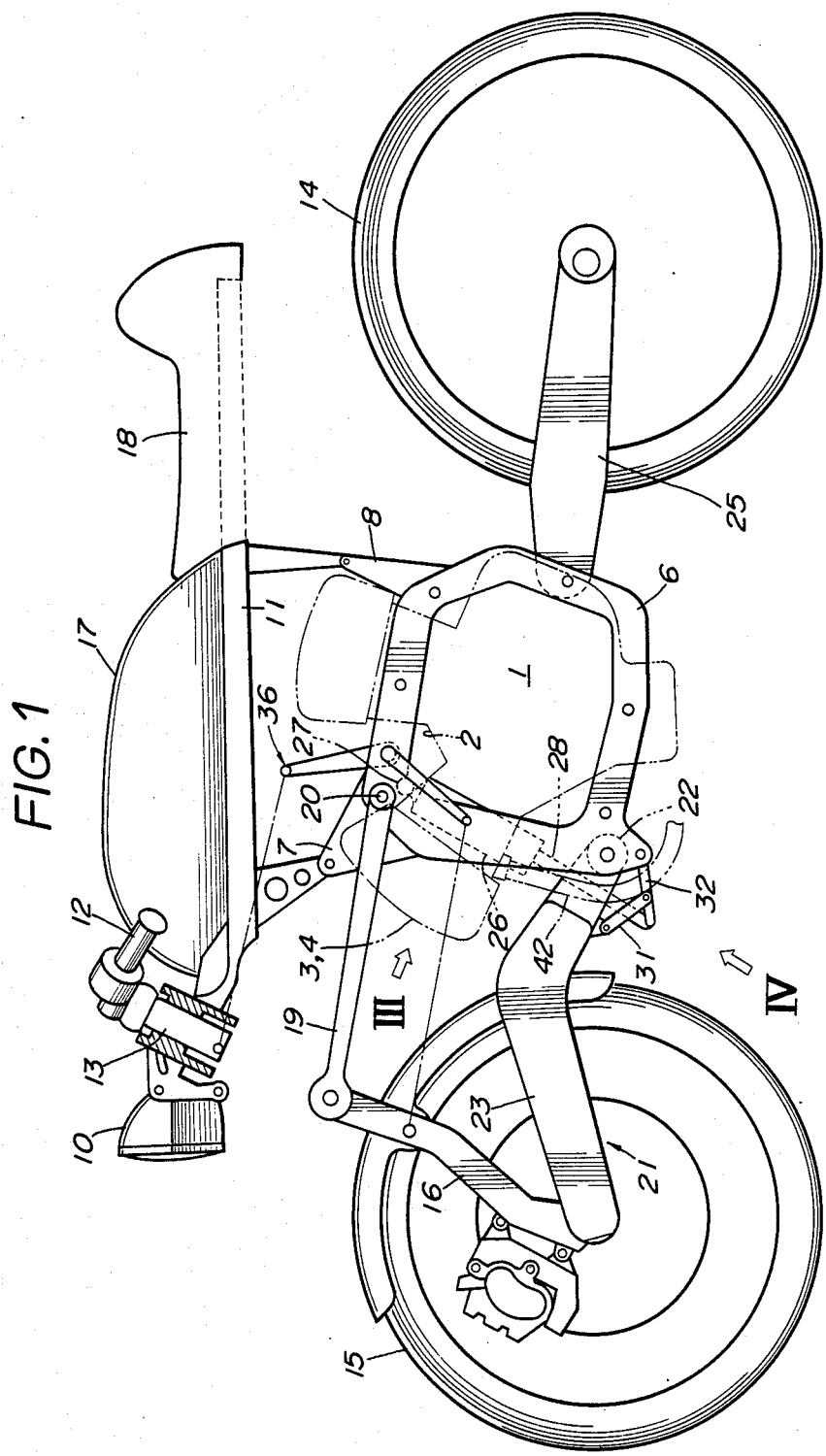
FIG. 1 is a schematic side elevational view of a motorcycle having a swing-arm front suspension mechanism according to the present invention.

As shown in FIG. 1, a motorcycle includes an engine 1 located between a front wheel 15 and a rear wheel 14. The engine 1 is a four-cycle, four-cylinder internal combustion engine which is substantially V-shaped in side elevation. The engine 1 has a cylinder block 2 including a pair of laterally spaced front cylinders 3, 4 (FIG. 2) in its front portion. Two laterally spaced, centrally open side frames 6 are disposed one on each side of the engine 1 which is coupled and supported between the side frames 6. An upper longitudinal frame 11 is supported on the side frames 6 by means of front and rear brackets 7, 8. A handlebar 12 is centrally coupled to a substantially vertical steering shaft 13 rotatably supported on the front end of the upper frame 11. A head lamp 10 is also mounted on the front end of the upper frame 11. A fuel tank 17 is mounted on the upper frame 11 behind the steering shaft 13, and a rider's seat or saddle 18 is also mounted on the upper frame 11 behind the fuel tank 17.

Figure 2:
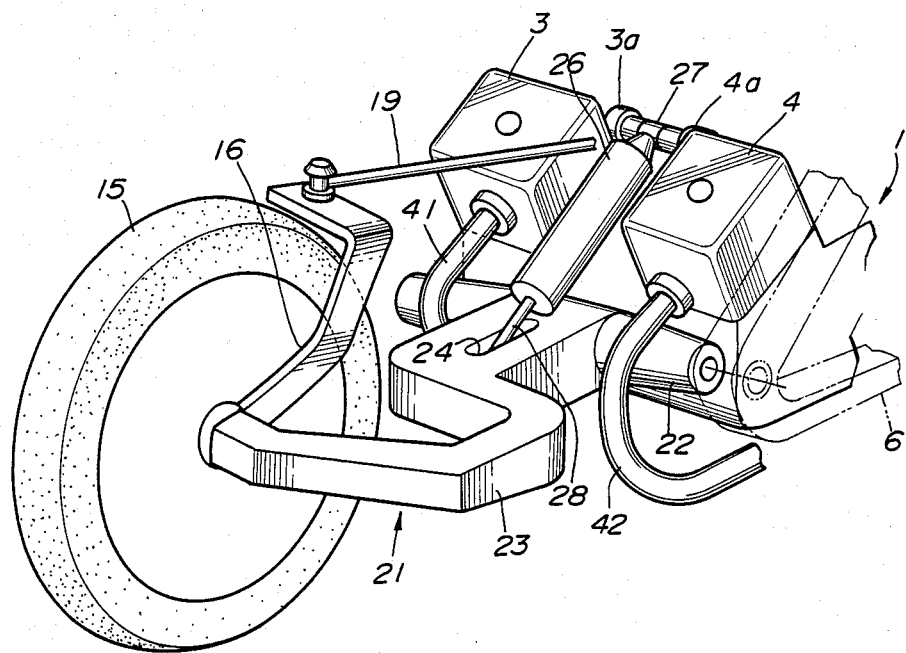
FIG. 2 is a fragmentary schematic perspective view of the motorcycle shown in FIG. 1.

The front wheel 15 has its axle supported on the lower end of a substantially vertical knuckle 16 inclined slightly rearwardly. The knuckle 16 extending upwardly from the axle of the front wheel 15 has its upper end supported steerably on the front end of an upper swing arm through an appropriate pivot joint, as shown in FIGS. 1 and 2. The upper swing arm 19 is pivotally supported at its rear end on the side frames 6 by a lateral pin 20 coupled therebetween behind the front cylinders 3, 4. The lower end of the knuckle 16 is also steerably supported on the front end of a lower swing arm 21 through an appropriate connection.

The lower swing arm 21 is of a substantially T shape, as viewed in plan, including, as a unitary structure, a tubular pivot 22 disposed at the rear end of the arm 21 and extending transversely of the motorcycle, and a hook-shaped arm member 23 extending forwardly from the center of the pivot 22 and having a front portion curved laterally on one side of the front wheel 15. The tubular pivot 22 of the lower swing arm 21 is pivotally supported at its opposite ends on and between front lower portions of the side frames 6.

Figure 3:
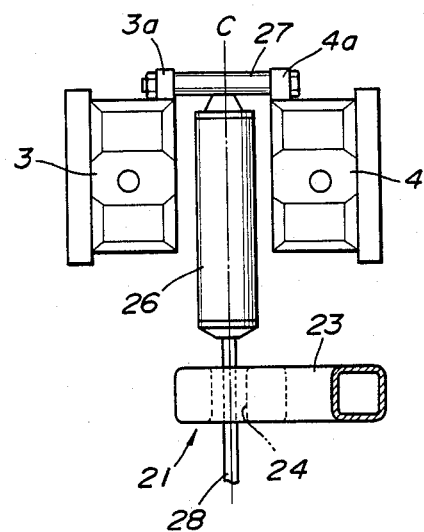
FIG. 3 is a view of a portion of the motorcycle as viewed in the direction of the arrow III in FIG. 1.
Figure 4:
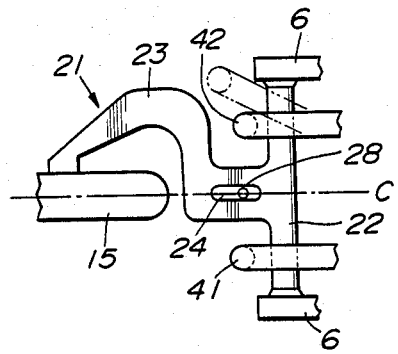
FIG. 4 is a view of a portion of the motorcycle as viewed in the direction of the arrow IV in FIG. 1.

As shown in FIGS. 3 and 4, the front engine cylinders 3, 4 have respective rear bosses 3a, 4a projecting rearwardly. A hydraulic damper or shock absorber 26 is obliquely disposed between the engine cylnders 3, 4 and has a pipe 27 on its upper end, the pipe or shaft 27 being pivotally supported on and connected between the rear bosses 3a, 4a. The damper 26 has a lower rod 28 extending downwardly through a slot 24 defined in a rear portion of the arm member 23. The lower end of the damper rod 28 is pivotally joined to the front end of a link 32 (FIG. 1), the rear end of which is pivotally connected to the side frames 6. The link 32 has its intermediate portion pivotally connected to the lower end of a link 31 with its opposite end pivotally coupled to the arm member 23. Since the hydraulic damper 26 is located between the front engine cylinders 3, 4, the hydraulic damper 26 may be of an increased length irrespective of space limitations imposed by the front wheel 15, the engine 1, and the lower swing arm 21. Therefore, the freedom of the cushioning stroke of the hydraulic damper 26 is great for increased cushioning capability.

The rear wheel 14 is rotatably supported on the rear end of a rear fork 25 which has its front end pivotally supoprted on the side frames 6. Although not shown, the rear wheel 14 is driven by a suitable power transmitting mechanism, such as a chain and sprockets which transmits rotative power from the engine 1 to the rear wheel 14.

The knuckle 16 can be steered by the steering shaft 13 coupled to the handlebar 12 through a steering link mechanism, generally designated at 36 in FIG. 1.

As shown in FIGS. 2 and 4, exhaust pipes 41, 42 connected to front sides of the front engine cylinders 3, 4, respectively, extend vertically in front of the tubular pivot 22 of the lower swing arm 21 in respective positions one on each side of a rear portion of the arm member 23 connected to the center of the pivot 22.

As illustrated in FIGS. 3 and 4, the hydraulic damper 26 has its central axis aligned with the longitudinal central axis C of the motorcycle. However, the hydraulic damper 26 may not necessarily be in exact alignment with the longitudinal central axis C of the motorcycle, but may be positioned closely to the longitudinal central axis C. Since the weights of the damper 26 and the links 31, 32 are centered on or closely to the longitudinal central axis C of the motorcycle, the motorcycle is well weight-balanced, and does not undergo from undesirable moment which would otherwise result from an offset or displaced point where cushioning load would be applied.

Figure 5:
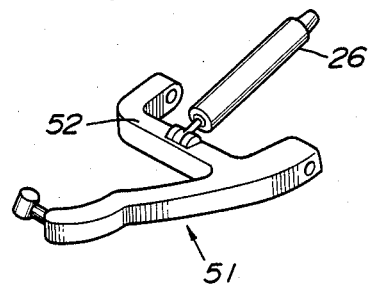
FIG. 5 is a perspective view of a lower swing arm and a damper according to a modification.

FIG. 5 shows a modification in which the hydraulic damper 26 has its lower end directly coupled to a lower swing arm 51 which is substantially y-shaped as viewed in plan. The lower swing arm 51 has a rear bifurcated member 52 with its opposite ends pivotally coupled to the respective side frames 6.

Figure 6:
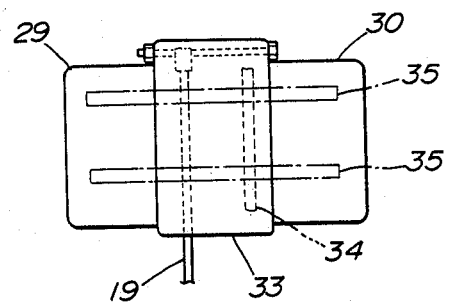
FIG. 6 is a plan view of engine cylinders according to another modification.

According to another modification shown in FIG. 6, two engine cylinders 29, 30 are joined to a central valve operating chamber 33 housing therein a valve operating mechanism 34 and sharing common cam shafts 35. The upper arm 19 and the lower arm (not shown) are disposed between the space defined between the engine cylinders 29, 30 and have ends pivotally coupled to the engine cylinders 29, 30.

The engine 1 is not limited to the illustrated configuration which is V-shaped as viewed in side elevation, but may be an engine which is V-shaped as viewed in front elevation.

The present invention is not limited to two-wheel motorcycles, but is also applicable to three-wheel motor vehicles.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A motorcycle comprising:
   a frame assembly;
   a front wheel;
   an engine supported on said frame assembly and having at least two cylinders transversely juxtaposed to one another with a space therebetween; and
   a front suspension system including an upper swing arm having one end connected for swinging motion to said frame assembly, a lower swing arm having one end connected for swinging motion to said frame assembly, and a knuckle having an upper end connected for steering motion to an opposite end of said upper swing arm and a lower end connected for steering motion to an opposite end of said lower swing arm, said front wheel being journalled in said lower end of the knuckle;
   said front suspension system further including a damper, said damper extending through said space between the cylinders and having an upper end pivotally connected to a shaft supported between said cylinders and a lower end pivotally connected through a link mechanism to said frame assembly.

2. A motorcycle as recited in claim 1, wherein:
   said lower swing arm has a through hole, and said damper has a rod extending downwardly through said hole of the lower swing arm and having a free end pivotally connected to said link mechanism.

3. A motorcycle as recited in claim 2, wherein a central axis of said damper is substantially aligned with the central longitudinal axis of the motorcycle.

4. A motorcycle as recited in claim 1, wherein:
   said frame assembly has right and left side frames, and said lower swing arm has a pivot shaft extending between said right and left side frames, and said motorcycle further including exhaust pipes extending forwardly and then curving around the outer periphery of said pivot shaft of the lower swing arm.

5. A motorcycle comprising:
   a body;
   a front wheel;
   an engine supported on said body and having at least two cylinders transversely juxtaposed to one another with a space therebetween; and
   a front suspension system including an upper swing arm having one end connected for swinging motion to said body, an arcuately-shaped lower swing arm having one end connected for swinging motion to said body, and a knuckle having an upper end connected for steering motion to an opposite end of said upper swing arm and a lower end connected for steering motion to an opposite end of said lower swing arm, said front wheel being journalled in said lower end of the knuckle;
   said front suspension system further including a damper, said damper extending through said space between the cylinders and having an upper end pivotally connected to a shaft extending supported between said cylinders and a lower end pivotally connected to said lower swing arm.

6. A motorcycle as recited in claim 8, wherein:
   a central axis of said damper is substantially aligned with the central longitudinal axis of the motorcycle.

* * * * *

UNITED STATES PATENT AND TRADEMARK OFFICE
CERTIFICATE OF CORRECTION

PATENT NO. : 4,821,833
DATED      : April 18, 1989
INVENTOR(S) : Ken YAMAGUCHI

It is certified that error appears in the above-identified patent and that said Letters Patent is hereby corrected as shown below:

Column 2, line 34, after "arm" insert --19--;
         line 55, after "pipe" (first occurrence) insert --or shaft--; after "pipe" (second occurrence) delete "or shaft".
Column 3, line 7, correct the spelling of "supported";
         line 30, delete "from".
Column 4, line 28 (Claim 3, line 1), after "wherein" insert a colon;
         line 59, (Claim 5, line 20), delete "extending";
         line 62, (Claim 6, line 1), change "8" to --5--.

Signed and Sealed this

Third Day of October, 1989

Attest:

DONALD J. QUIGG

*Attesting Officer*   Commissioner of Patents and Trademarks